United States Patent
De Vaan

(10) Patent No.: US 7,510,316 B2
(45) Date of Patent: Mar. 31, 2009

(54) ULTRA COMPACT ILLUMINATION SYSTEM FOR DISPLAY SYSTEMS

(75) Inventor: Adrianus Johannes Stephanes Maria De Vaan, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 200 days.

(21) Appl. No.: 10/564,294

(22) PCT Filed: Jun. 6, 2004

(86) PCT No.: PCT/IB2004/051136

§ 371 (c)(1),
(2), (4) Date: Jan. 10, 2006

(87) PCT Pub. No.: WO2005/006036

PCT Pub. Date: Jan. 20, 2005

(65) Prior Publication Data

US 2006/0158902 A1    Jul. 20, 2006

(30) Foreign Application Priority Data

Jul. 14, 2003    (EP) .................................. 03102136

(51) Int. Cl.
*F21V 7/22* (2006.01)

(52) U.S. Cl. .................. 362/622; 362/606; 362/612; 362/613; 362/620; 362/626; 362/800

(58) Field of Classification Search ................ 362/606, 362/608, 609, 612, 613, 617, 619, 620, 622, 362/626

See application file for complete search history.

(56) References Cited

U.S. PATENT DOCUMENTS

| | | | | |
|---|---|---|---|---|
| 4,975,808 A * | 12/1990 | Bond et al. | ................ | 362/609 |
| 5,618,096 A * | 4/1997 | Parker et al. | ............... | 362/629 |
| 5,695,269 A | 12/1997 | Miller et al. | | |
| 5,769,521 A * | 6/1998 | Osawa et al. | ................ | 362/27 |
| 6,065,845 A * | 5/2000 | Miyazaki | ................ | 362/26 |
| 6,139,163 A * | 10/2000 | Satoh et al. | ................ | 362/612 |
| 6,191,872 B1 * | 2/2001 | DeCaro et al. | ............ | 358/509 |
| 6,396,637 B2 | 5/2002 | Roest et al. | | |
| 6,508,571 B2 * | 1/2003 | Chuang | ................ | 362/237 |
| 6,547,400 B1 * | 4/2003 | Yokoyama | ................ | 353/98 |
| 6,601,962 B1 * | 8/2003 | Ehara et al. | ................ | 362/612 |
| 6,840,647 B2 * | 1/2005 | Hayashi et al. | ............. | 362/84 |
| 7,073,933 B2 * | 7/2006 | Gotoh et al. | ............... | 362/624 |
| 7,192,147 B2 * | 3/2007 | Sakata et al. | ................ | 362/19 |
| 7,265,800 B2 * | 9/2007 | Jagt et al. | ................ | 349/61 |
| 2002/0063820 A1 | 5/2002 | Broer et al. | | |

* cited by examiner

*Primary Examiner*—Jong-Suk (James) Lee
*Assistant Examiner*—Leah S Lovell

(57) ABSTRACT

An illumination system includes a light guide having an entrance face, an exit face and an aperture in which a light source can be arranged Various elements are arranged in the light guide to increase the angle of light beams incident in the light guide with respect to the optical axis of the system and to create a homogeneous illumination at the exit face of the light guide. With this arrangement, the length of a given light guide is reduced, making the illumination system smaller, lighter and more compact with even illumination and a high optical efficiency. The illumination system can be included in a display system.

20 Claims, 8 Drawing Sheets

ULTRA COMPACT ILLUMINATION SYSTEM FOR DISPLAY SYSTEMS

The present invention relates to an illumination system comprising a light guide having an entrance face, an exit face and an aperture in which a light source can be arranged.

Light sources comprising LEDs (Light Emitting Diodes) are designed to produce higher and higher light outputs. It is envisaged that LED light sources will be used in projection systems, ranging from low power mobile applications (like micro beamers in cellular phones) to applications that require several hundreds to thousands of lumen. A disadvantage of LED light sources is that the light is generated in a semiconductor material having a very high refractive index, resulting in the fact that the light from the LED is emitted in all directions.

In recent years, developments relating to light recycling methods in optical systems comprising rod-type light guides have increased. Future light guide systems might lead to very compact illumination systems, and may therefore be suited for ultra compact projection systems. The physical length and weight of the rod-type light guide is determined by the maximum angular distribution of the light beam in the light guide. The length of the rod-type light guide need to be long enough, such that the light beams in the light guide will be reflected against the inner surface of the guide a sufficient number of times to obtain a homogeneous illumination at the exit face of the light guide. Light beams entering the rod-type light guide, and having a small angle with respect to the optical axis of the guide, need to travel a longer distance before they evenly can illuminate the end face of the light guide, i.e. the light guide must be sufficiently long for uniform illumination to be possible.

U.S. Pat. No. 6,547,400 discloses a light source device comprising a light guide block that is provided with an inner wall capable of reflecting light and is shaped as a hollow component to form a light guide, and a point light source array that is located opposite one end face of the light guide block and is capable of emitting light into the light guide. In the patent, it is described that light emitted from the area near the center of the light source array, the light source array comprising of a plurality of LEDs, is submitted through the exit face of the light guide without being reflected from the reflective inner surfaces of the light guide.

A problem with U.S. Pat. No. 6,547,400 is that the light guide must be sufficiently long for uniform illumination to be possible at the exit surface of the guide. Due to this fact, the light guide becomes bulky, which is fundamentally incompatible with the trend towards smaller, lighter and more compact projectors.

It is an object of the present invention to solve the above given problem and provide an illumination system being small, light and compact and which system provides homogeneous illumination and high optical efficiency.

This object is achieved by an illumination system comprising a light guide having an entrance face, an exit face and an aperture in which a light source can be arranged in accordance with claim 1. Preferred embodiments are defined by the dependent claims.

According to an aspect of the invention, a light reflective structure is arranged in proximity to the light guide entrance face, the light reflective structure being arranged with an aperture in which the light source can be fitted. Further, a first light refractive structure is arranged in proximity to the light guide exit face. In the first light refractive structure, at least a subset of light beams of a first angular interval with respect to the optical axis of the system is refracted to illuminate the light guide exit face, and at least a subset of light beams of a second angular interval with respect to said optical axis is reflected to be recycled in the light guide.

The idea of the present invention is that various elements are arranged in the light guide to increase the angle of light beams incident in the light guide with respect to the optical axis of the system and to create a homogeneous illumination at the exit face of the light guide. A light reflective structure is arranged in proximity to the light guide entrance face, and the light reflective structure is arranged with an aperture in which the light source, in the form of e.g. a LED, a laser or a gas discharge lamp, can be fitted. A first light refractive structure is arranged in proximity to the light guide exit face, in which first light refractive structure at least a subset of light beams of a first angular interval, with respect to the optical axis, is refracted to illuminate the light guide exit face. The first angular interval is defined as the angular interval starting from the minimum angle that a light beam must have, with respect the optical axis, to be transmitted through the first refractive structure, up to 90°, which of course is the largest angle a light beam can have in order to incide on a structure coaxial with the optical axis. Further, in the first light refractive structure, at least a subset of light beams of a second angular interval with respect to the optical axis is reflected to be recycled in the light guide. The second angular interval is defined as the angular interval starting from 0° up to the maximum angle that a light beam can have, with respect the optical axis, and still be reflected in the first refractive structure. The LED light beams pertaining to the first angular interval, i.e. light beams of a relatively "large" angle with respect to the optical axis, will be transmitted through the first refractive structure and illuminate the exit face of the light guide. The LED light beams pertaining to the second angular interval, i.e. light beams of a "small" angle with respect to the optical axis, will be reflected in the first refractive structure and, subsequently, recycled in the light guide. The light beams reflected in the first refractive structure will incide on the light reflective structure at the entrance face of the light guide and, thus, be reflected against this light reflective structure and the surface of the LED itself. These light beams will eventually reach the first angular interval and thus be transmitted through the first refractive structure.

The present invention is advantageous, since the claimed illumination system decreases the length of a given light guide, making the illumination system smaller, lighter and more compact with even illumination and a high optical efficiency. The first refractive structure, being for example a film with a prism structure, has the advantage that the length of the light guide drastically can be reduced. This is due to the fact that the distance that the light beams of the first angular interval will have to travel to make a sufficient number of round trips in the light guide, to obtain an even illumination at the light guide exit face, will be substantially reduced. The reduction of the light guide size is extremely important for micro projectors, mobile phone applications and other applications requiring as small components as possible. Further, the light reflective structure, being e.g. a mirror, will see to it that light beams first reflected in the prism subsequently will be reflected in this mirror and eventually reach the first angular interval and thus be transmitted through the prism. This will, apart from providing even illumination, result in effective light recycling.

According to an embodiment of the invention, a light diffusing element is arranged between the light reflective structure and the first light refractive structure to alter the angle of light beams incident on said diffusing element with respect to the optical axis. This embodiment has the advantage that the angle of the light beams with respect to the optical axis of the system will be increased. The light beams of the second angular interval will reach the first angular interval in a fewer number of round trips. This is a result of the fact that the distance that the light beams pertaining to the second angular interval will have to travel to make a sufficient number of round trips in the light guide, to obtain an even illumination at the light guide exit face, will be reduced. The result is that the size of the light guide itself can be reduced.

According to another embodiment of the invention, a reflective polarizer is arranged in proximity to the light guide exit face to transmit light beams of a first polarization mode and reflect light beams of a second polarization mode.

Pursuant to yet another embodiment of the present invention, a polarization converting element is arranged in the light guide, for example on the mirror at the entrance face, to alter the polarization mode of light beams incident on the polarization converting element. This has the advantage that the polarization converting element will alter the polarization mode of the light beams reflected in the reflective polarizer, i.e. the light beams of the second polarization mode, such that these light beams will adopt the first polarization mode. The effect will be that these light beams, now having the first polarization mode, will be transmitted through the reflective polarizer.

In accordance with a further embodiment of the invention, a second light refracting structure being for example a film with a prism structure, is arranged in proximity to the light guide entrance face to increase the angle of light beams refracted in said second light refracting structure with respect to the optical axis. This embodiment has the advantage that, since incident light beams of the second angular interval is refracted in the second light refracting structure and the refracted light beams will be of the first angular interval, the light beams of the second angular interval passing through the second light refracting structure will reach the first angular interval at an early stage in the light guide. Thus, the size of the light guide will be reduced.

According to yet further embodiments of the invention, the light guide is arranged with a plurality of apertures, wherein a light source can be arranged in each aperture and a dichroic coating adapted to the spectral properties of the respective light source is arranged in each aperture. This embodiment has the advantage that the light beams having the spectral properties adapted to each dichroic coating will pass the entrance face mirror, i.e. the light reflective structure, and light beams having other spectral properties is reflected. This allows multiple LEDs of different colors to be coupled to the illumination system, for example one red LED, one green LED and one blue LED.

Further features of, and advantages with, the present invention will become apparent when studying the appended claims and the following description. Those skilled in the art realize that different features of the present invention can be combined to create embodiments other than those described in the following. Many different alterations, modifications and combinations will become apparent for those skilled in the art. Alternative embodiments might for instance use laser light sources or gas discharge lamps.

The preferred embodiments of the present invention will be described in more detail with reference made to the attached drawings, in which.

Figure 5:
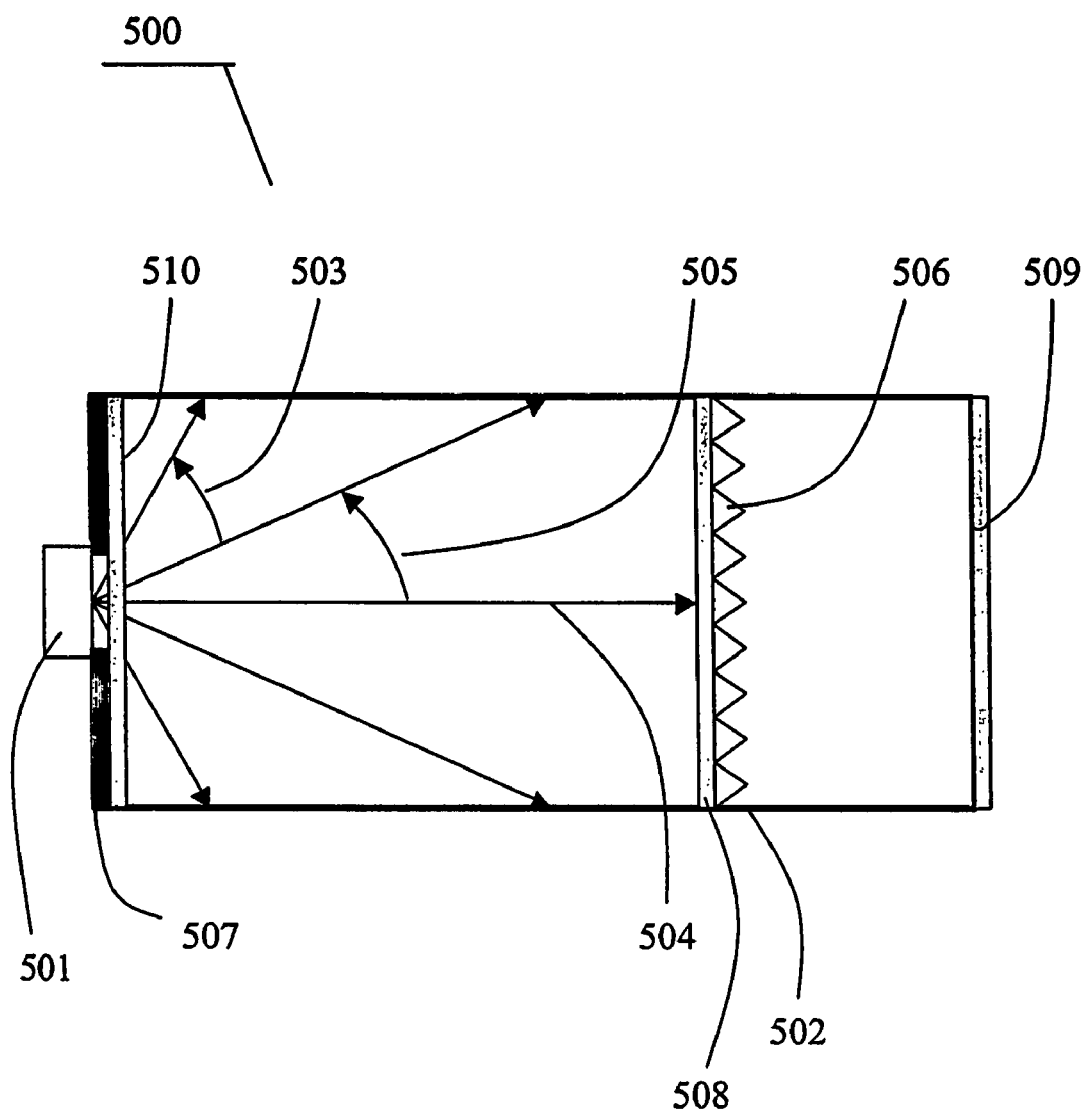
FIG. 5 shows an illumination system according to FIG. 4, further arranged with a reflective polarizer and a polarization converting element in accordance with an embodiment of the present invention.
Figure 6:
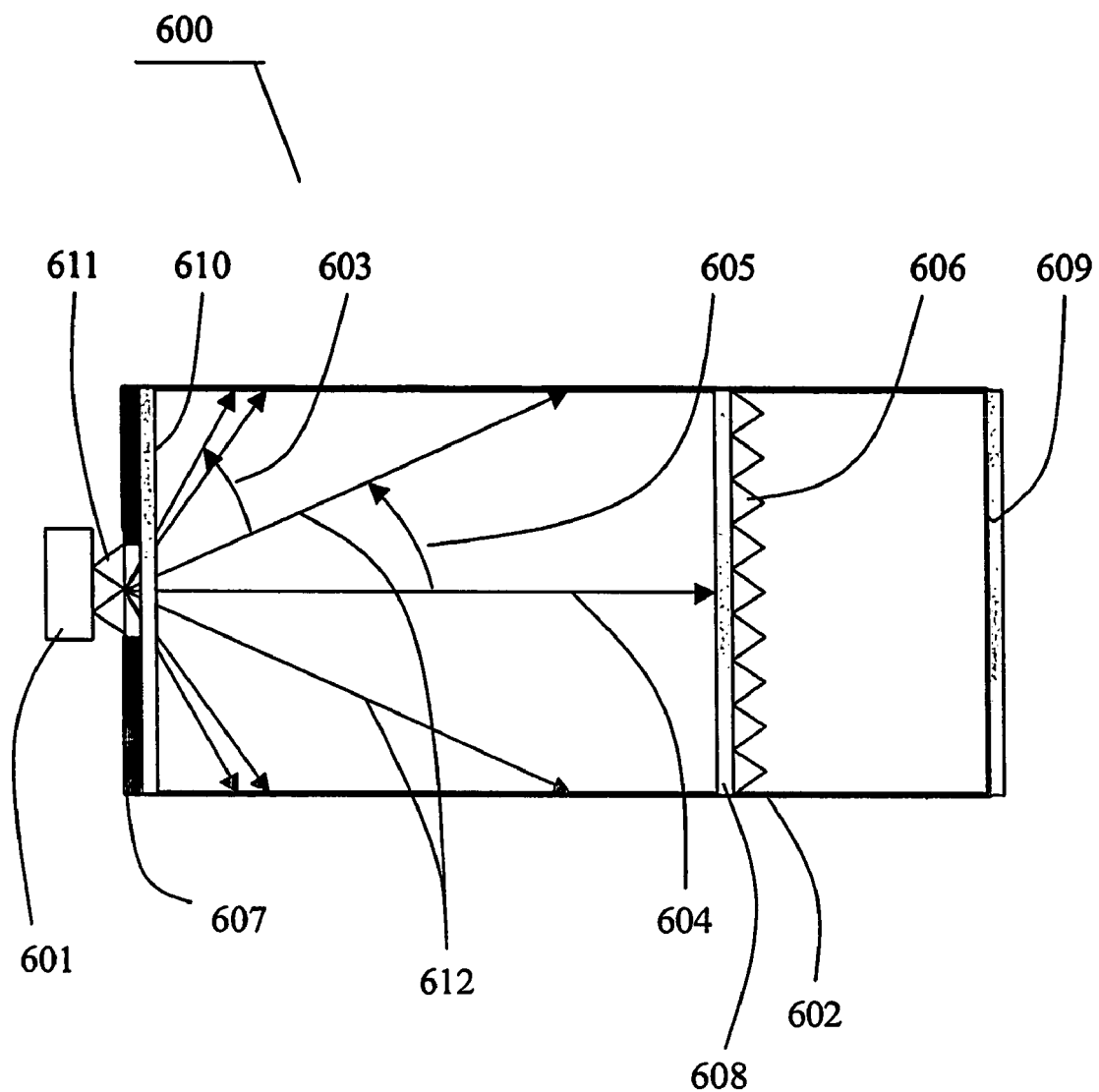
Figure 7:
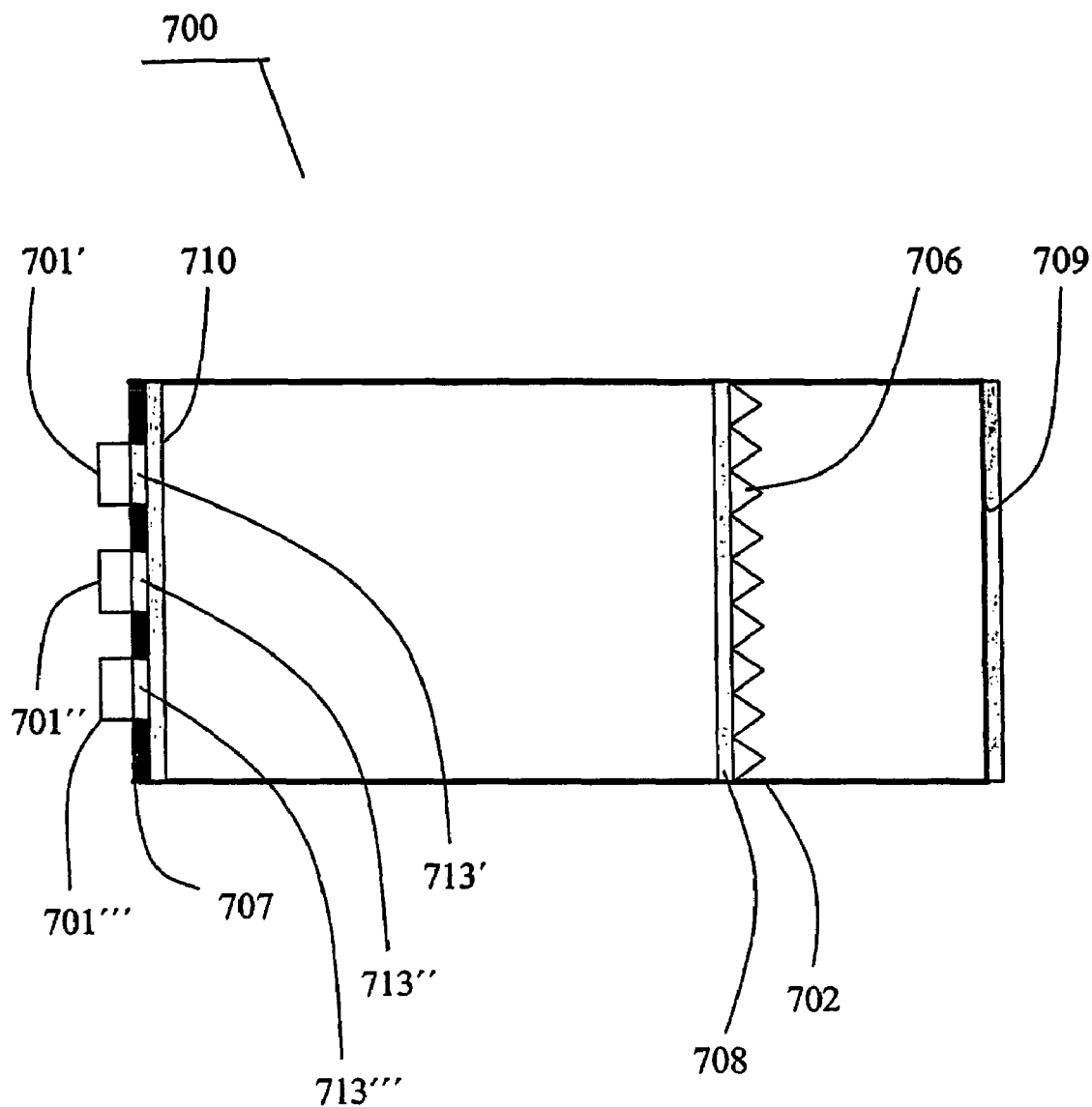

FIG. 6 shows an illumination system according to FIG. 5, further arranged with a second light refracting structure at the entrance face of the light guide in accordance with an embodiment of the present invention; and FIG. 7 shows an illumination system according to FIG. 5 being arranged with a plurality of apertures, wherein a light source can be arranged in each aperture in accordance with an embodiment of the present invention.

Figure 3:
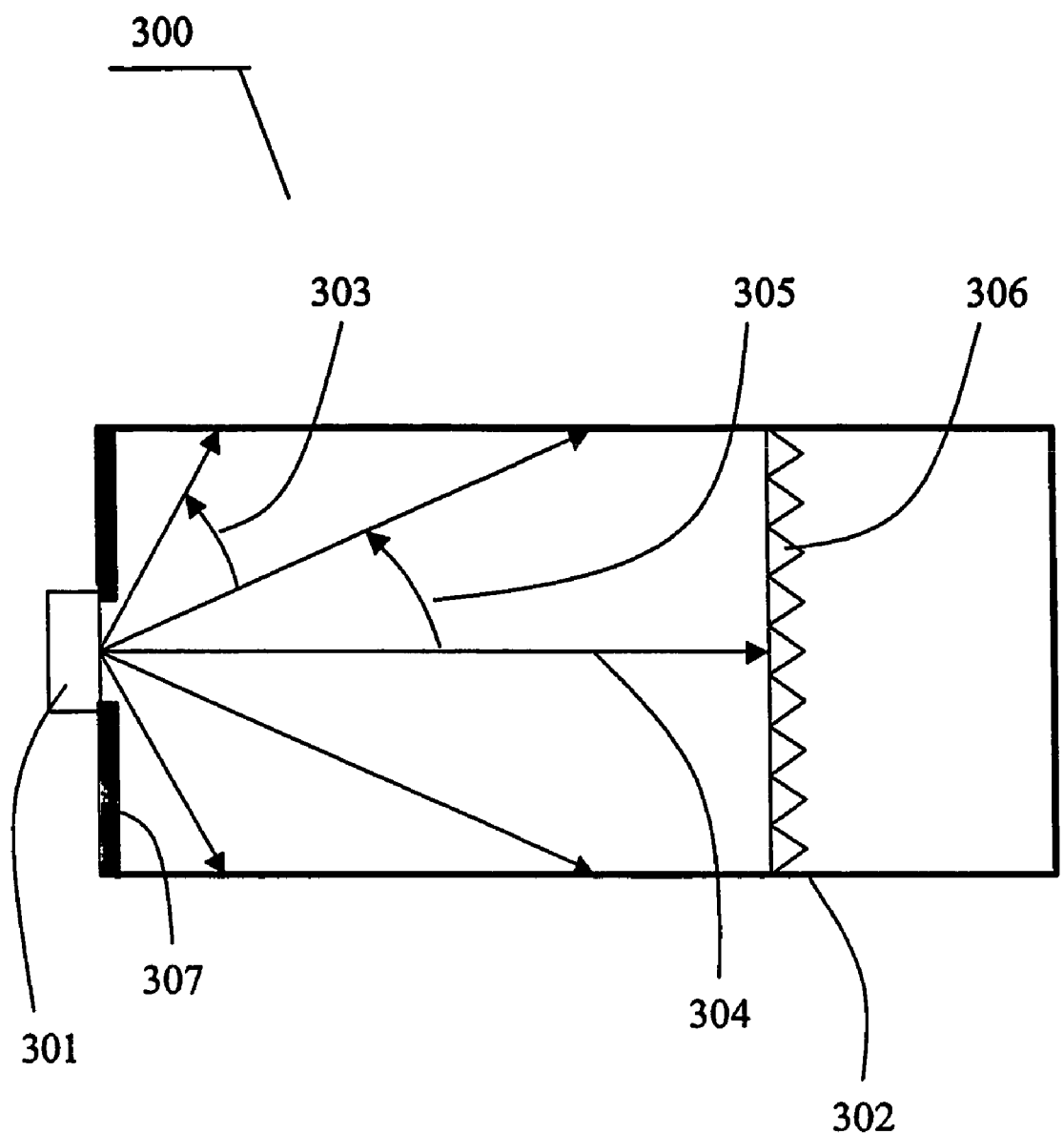
FIG. 3 shows an illumination system arranged with a refractive structure as shown in FIG. 2 and a reflective structure for providing light recycling in accordance with an embodiment of the present invention.
Figure 8:
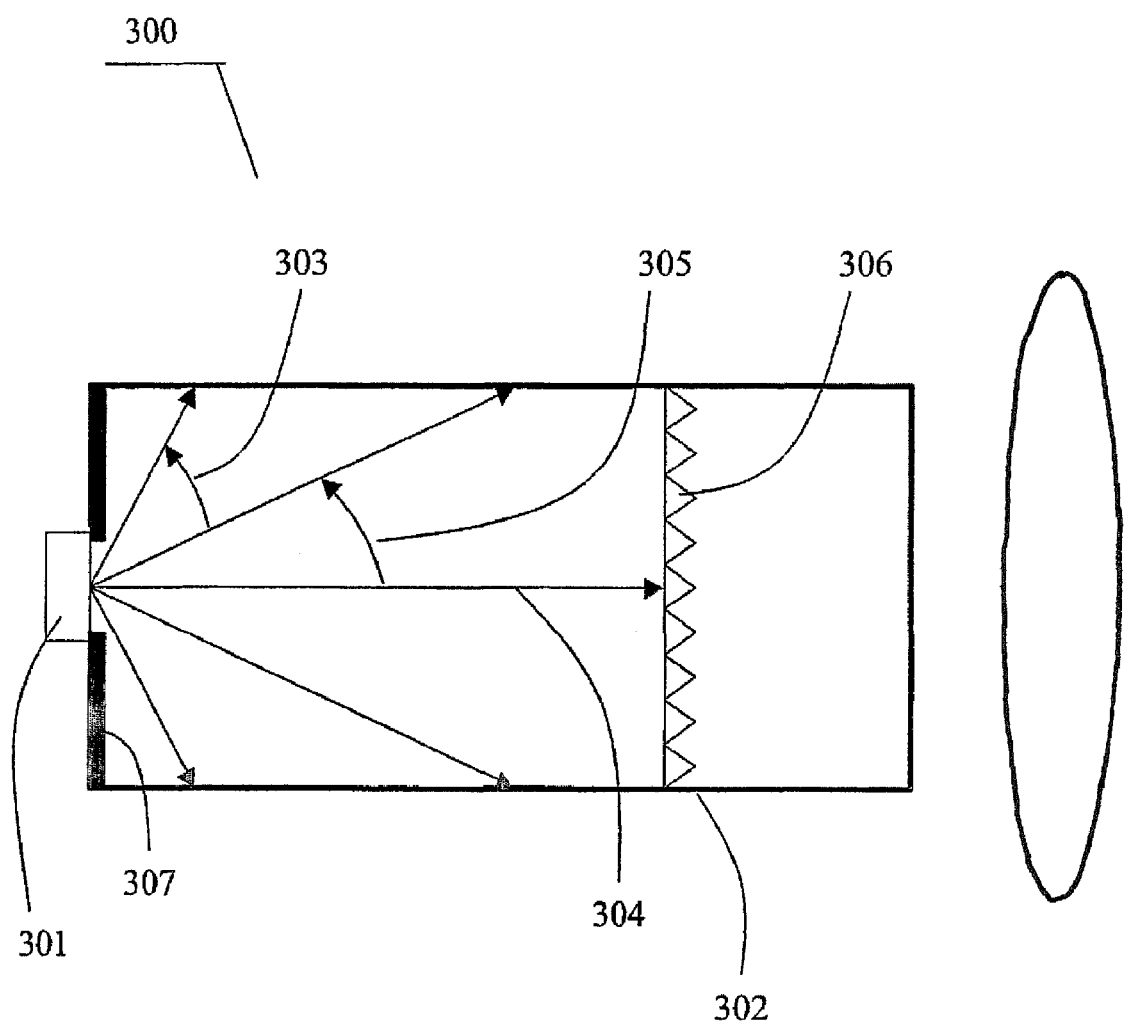

FIG. 8 shows the illumination system of FIG. 3 further including a projection lens.

Figure 1:
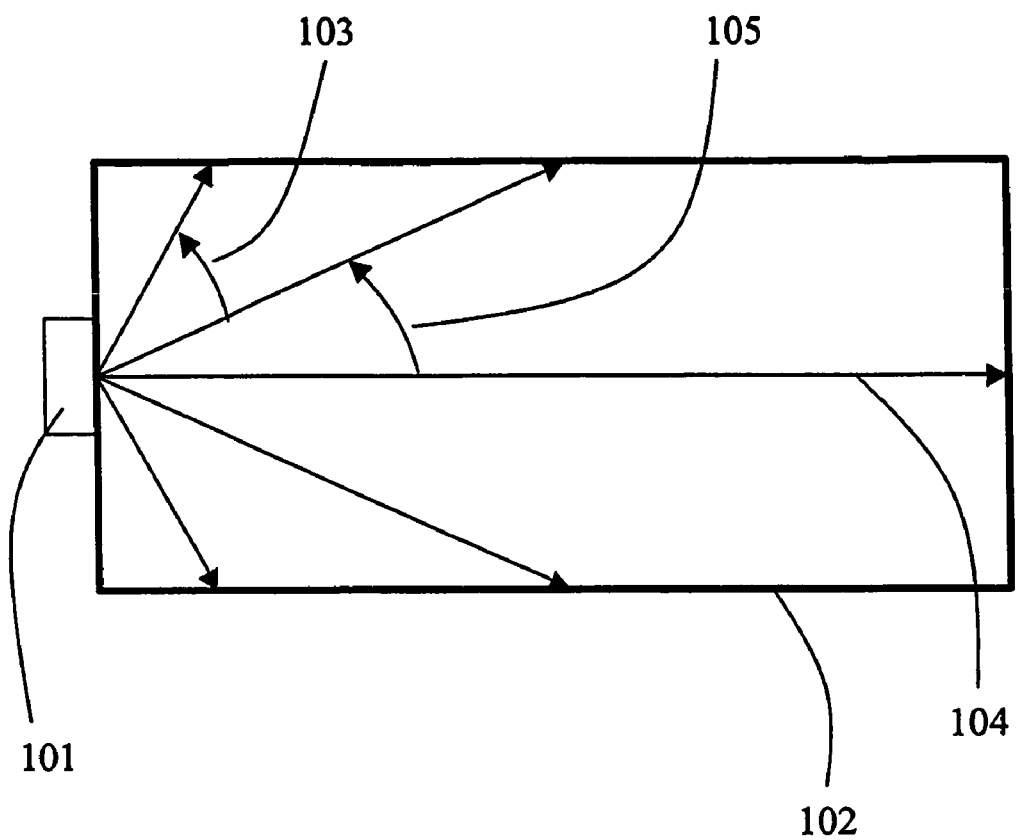
FIG. 1 shows a prior art optical system comprising a rod-type light guide.

FIG. 1 shows a prior art optical system comprising a rod-type light guide. A LED 101 is located at the entrance face of a light guide 102. The LED 101 emits light in all directions, but the light beams can be modeled as being comprised in one of two possible different angular intervals 103, 105. Light beams of the first angular interval 103 are beams having a "large" angle with respect to the optical axis 104, and light beams of the second angular interval 105 are beams having a "small" angle with respect to the optical axis 104. The light beams pertaining to the second angular interval 105 will subsequently pass the pupil of the projection lens (see, e.g. FIG. 8), while light beams of the first angular interval 103 will be blocked at the pupil of the projection lens. The physical length of the rod-type light guide 102 is mainly set by the light beams of the second angular interval 105. The length need to be long enough, such that the light beams of the second angular interval 105 in the light guide 102 will be reflected against the inner surface of the guide 102 a sufficient number of times to obtain a homogeneous illumination at the exit face of the light guide 104.

Figure 2:
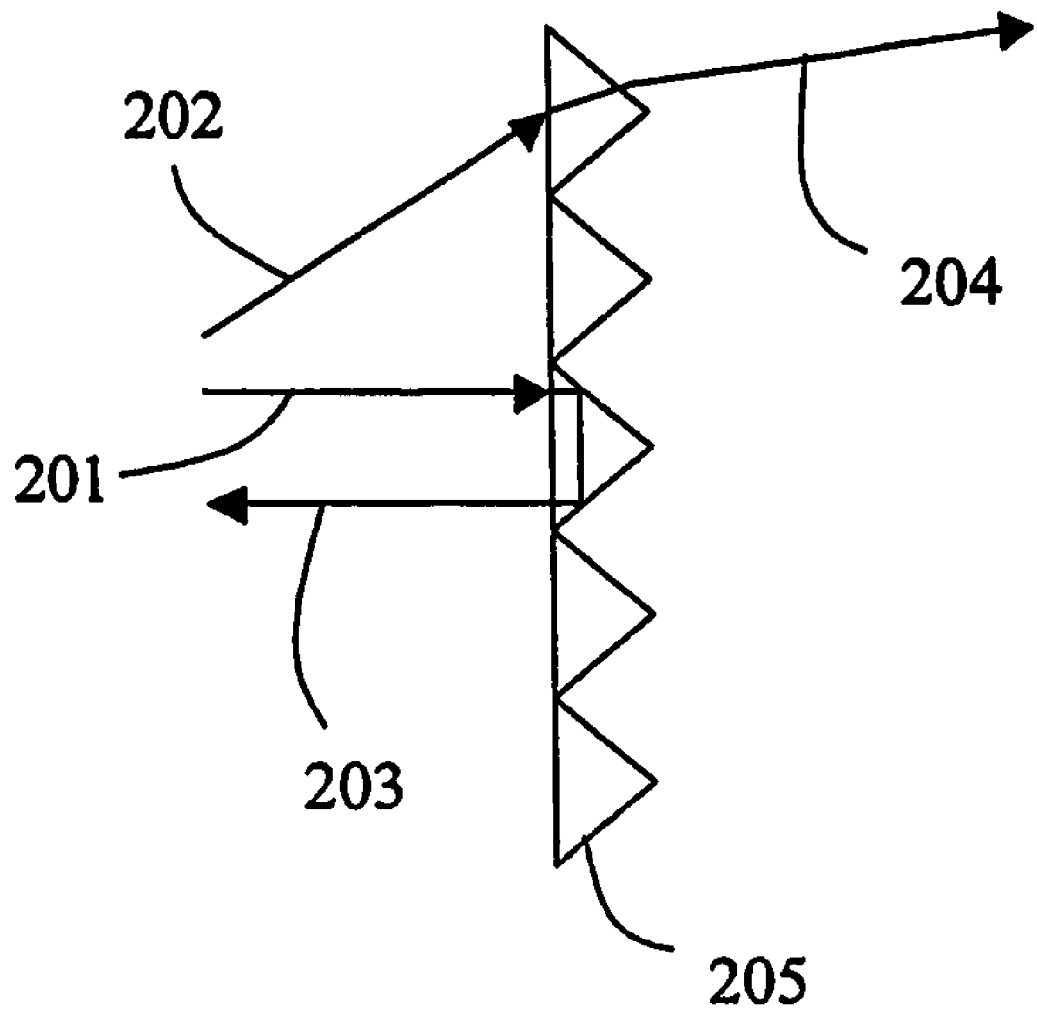
FIG. 2 shows a principal diagram of how light beams are refracted in a prism structure employed in the present invention.

FIG. 2 shows a principal diagram of the refraction of light beams in a prism structure 205 employed in the invention. The prism structure 205 is constructed such that light beam 202, which is comprised in the first angular interval, is refracted in the prism structure 205 and the resulting light beam 204 is adapted to the optical system in that it will pass the projection lens (not shown) later on in the system. Light beam 201, which is comprised in the second angular interval, will be reflected in the prism structure 205, resulting in light beam 203.

FIG. 3 shows an illumination system 300 according to an embodiment of the present invention. A LED 301 is fitted, at the entrance face of a light guide 302, in an aperture of a light reflective structure in the form of a mirror 307. At the exit face of the light guide 302, a first refractive structure, herein a film with a prism structure 306 (described with reference to FIG. 2), is arranged. The light beams pertaining to the first angular interval 303, i.e. light beams having a large angle with respect to the optical axis 304, are refracted in the prism structure 306 and will illuminate the exit face of the light guide 302. The light beams pertaining to the second angular interval 305, i.e. light beams having a small angle with respect to the optical axis 304, are reflected in the prism structure 306 and will be transmitted in the direction of the mirror 307 at the entrance face of the light guide 302. The light beams reflected in the prism structure 306 will incide on the mirror 307 and thus be reflected against the mirror 307 and the surface of the LED 301 itself. These light beams will eventually reach the first angular interval 303 and thus be transmitted through the prism structure 306.

Figure 4:
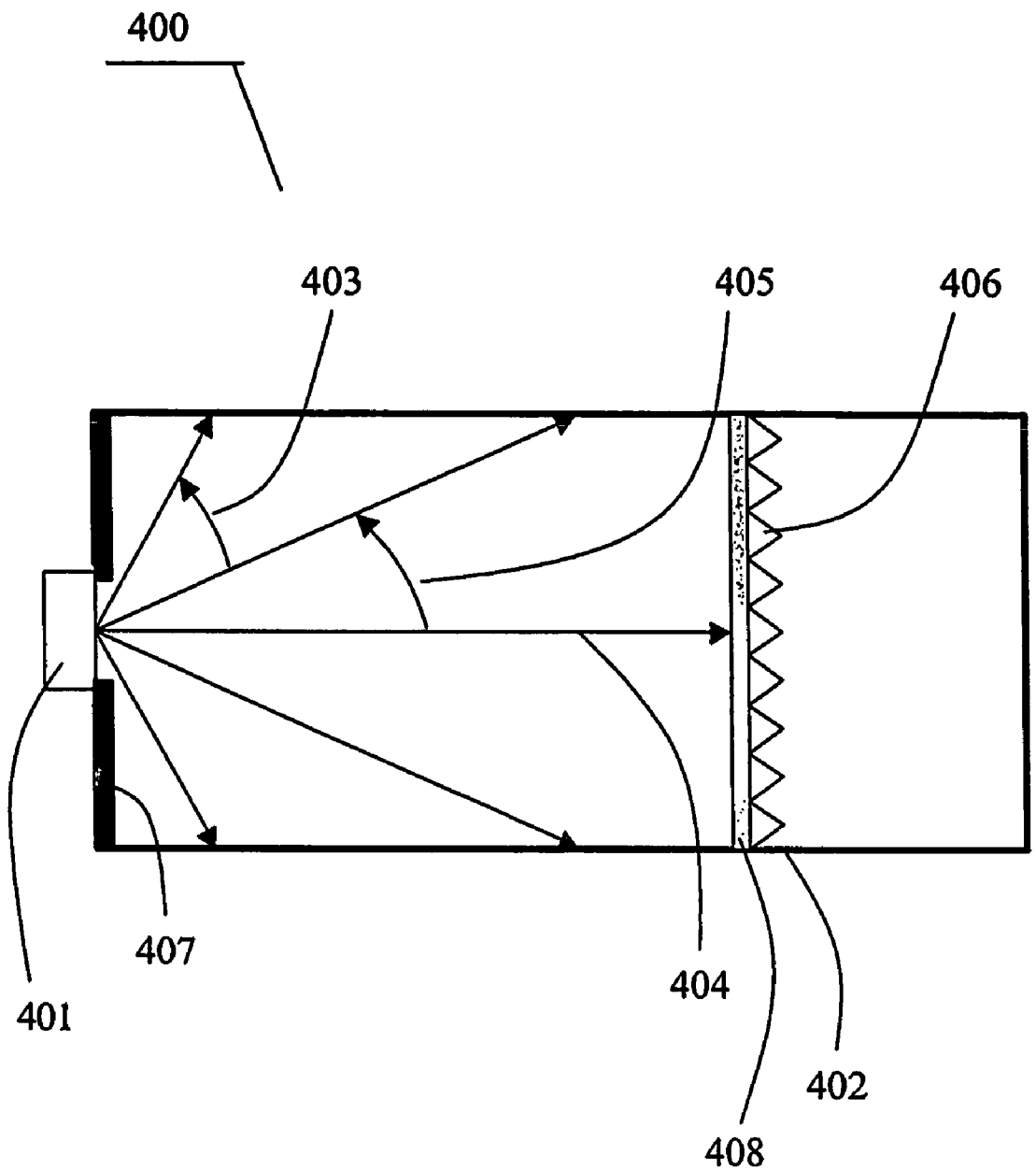
FIG. 4 shows an illumination system according to FIG. 3, further arranged with a light diffusing element in accordance with an embodiment of the present invention.

FIG. 4 shows the illumination system according to FIG. 3, further arranged with a light diffusing element 408 in accordance with an embodiment of the present invention. The light diffusing element 408 is arranged on the prism structure 406, but can be arranged virtually anywhere in the light guide 402 between the prism structure 406 and the mirror 407 to alter the angle of light beams incident on the diffusing element 408 with respect to the optical axis 404. The use of the light diffusing element 408 will have the effect that the angle of the light beams, with respect to the optical axis 404 of the illumination system 400, will be increased. The light beams of the second angular interval 405 will reach the first angular interval 403 in a fewer number of round trips, which consequently will reduce the length of the light guide 402.

FIG. 5 shows the illumination system according to FIG. 4, further arranged with a reflective polarizer 509 and a polarization converting element 510 in accordance with an embodiment of the present invention. The reflective polarizer 509 is arranged at the end face of the light guide 502 to transmit light beams of a first polarization mode and reflect light beams of a second polarization mode. The polarization converting element 510 is arranged on the mirror 507 to alter the polarization mode of light beams incident on the polarization converting element 510. The result of the embodiment in FIG. 5 is that the polarization converting element 510 will alter the polarization mode of the light beams reflected in the reflective polarizer 509, such that these light beams eventually will be transmitted through the reflective polarizer 509. The polarization converting element 510 is preferably a so called λ/4-film, but can also consist of a depolarizing material, such as a strong birefringent plastic material which is used in the prism structure 506 and the light diffusing element 508.

FIG. 6 shows the illumination system according to FIG. 5, further arranged with a second light refracting structure 611 in accordance with an embodiment of the present invention. The second light refracting structure, being a second prism structure 611, is arranged in the aperture of the mirror 607. The angle of light beams refracted in the second prism structure 611 will increase with respect to the optical axis 604 of the illumination system 600. Of all the light beams incident in the light guide 602, some light beams 612 would normally have been comprised in the second angular interval 605. However, with the second prism structure 611, these light beams will instead reach the first angular interval 603 at an early stage. Thus, the size of the light guide 602 will be reduced.

FIG. 7 shows an illumination system according to FIG. 5, the system 700 being arranged with a plurality of apertures, wherein a light source 701', 701", 701''' is arranged in each aperture in accordance with an embodiment of the present invention. Further, a dichroic coating 713', 713", 713''' adapted to the spectral properties of the respective light source 701', 701", 701''' is arranged in each aperture. This embodiment has the advantage that the light beams having the spectral properties adapted to each dichroic coating 713', 713", 713''' will pass the entrance face mirror 707, and light beams having other spectral properties is reflected. This allows multiple light sources 701', 701", 701''' comprising e.g. LEDs, lasers and gas discharge lamps of different colors to be coupled to the illumination system 700, for example one red LED, one green LED and one blue LED.

The illumination system according to the invention can also be used in other types of display systems where wave guides are applied, for example in direct view LCD systems, where it has the advantage that the light can be guided through a wave guide behind the LCD panel in a more optimal and efficient manner. Other display systems where the present invention can be used include direct view display systems, in which light is coupled out of a wave guide by means of electromechanical moving parts.

Even though the invention has been described with reference to specific exemplifying embodiments thereof, many different alterations, modifications and the like will become apparent for those skilled in the art. The described embodiments are therefore not intended to limit the scope of the invention, as defined by the appended claims.

The invention claimed is:

1. An illumination system comprising:
   a light guide having an entrance face, an exit face and an aperture in which a light source can be arranged, wherein the entrance face and exit of the light guide are opposite to and in parallel with each other;
   a light reflective structure arranged in proximity to the light guide entrance face, the light reflective structure being arranged with an aperture in which the light source can be fitted; and
   a first light refractive structure arranged in proximity to the light guide exit face, in which first light refractive structure:
   all light beams incident upon the first light refractive structure from a side of the light refractive structure closest to the entrance face and at a first angular interval with respect to the optical axis of the system are refracted to illuminate the light guide exit face, and
   all light beams incident upon the first light refractive structure from a side of the light refractive structure closest to the entrance face and at a second angular interval with respect to said optical axis are reflected to be recycled in the light guide.

2. The illumination system according to claim 1, further comprising:
   a light diffusing element arranged between the light reflective structure and the first light refractive structure to alter the angle of light beams incident on said diffusing element with respect to the optical axis.

3. The illumination system according to claim 1, further comprising:
   a reflective polarizer arranged in proximity to the light guide exit face to transmit light beams of a first polarization mode and reflect light beams of a second polarization mode.

4. The illumination system according to claim 1, further comprising:
   a polarization converting element arranged in the light guide to alter the polarization mode of light beams incident on said polarization converting element.

5. The illumination system according to claim 1, further comprising:
   a second light refracting structure arranged in proximity to the light guide entrance face to increase the angle of light beams refracted in said second light refracting structure with respect to the optical axis.

6. The illumination system of claim 5, wherein the second light refracting structure comprises a prism structure arranged in the aperture.

7. The illumination system according to claim 1, the light guide having a plurality of apertures, wherein a light source can be arranged in each aperture and a dichroic coating adapted to the spectral properties of the respective light source is arranged in each aperture.

8. The illumination system according to claim 1, wherein the light source includes at least one of a laser, an LED, and a gas discharge lamp.

9. A display system comprising the illumination system according to claim 1.

10. A projection display system comprising the illumination system according to claim 1.

11. A direct view LCD system comprising the illumination system according to claim 1.

12. The illumination system of claim 1, wherein the optical axis of the system is normal to light guide exit face, and wherein the subset of light beams of the first angular interval that are refracted by the first light refractive structure to illuminate the light guide exit face make an acute angle with respect to the optical axis that is greater than an acute angle with respect to the optical axis that is made by the subset of light beams of the second angular interval that is reflected to be recycled in the light guide.

13. The illumination system of claim 1, wherein the first light refractive structure comprises a plurality of prisms.

14. The illumination system of claim 1, further comprising a projection lens receiving light from the exit face of the light guide.

15. The illumination system of claim 1, wherein the light reflective structure comprises a mirror disposed on the entrance face.

16. An illumination system, comprising:
a rod-type light guide, including:
an entrance face at a first end of the rod-type light guide, the entrance face having an aperture formed therein wherein a light source can be provided,
a mirror disposed on the entrance face, the mirror having an aperture therein wherein the light source can be provided,
an exit face at a first end of the rod-type light guide opposite and in parallel to the first face, an optical axis extending between the entrance face and the exit face in a direction perpendicular to the entrance face and the exist face, and
a light refractive structure disposed between the entrance face and the exit face in proximity to the exit face, the light refractive structure being adapted to reflect all light beams incident thereon from a side of the light refractive structure closest to the entrance face at an acute angle with respect to the optical axis that is less than a first angle, and being adapted to refract all light beams incident thereon from the side of the light refractive structure closest to the entrance face at an acute angle with respect to the optical axis that is greater than a second angle, wherein the second angle is greater than or equal to the first angle.

17. The illumination system of claim 16, wherein the light refractive structure comprises a plurality of prisms.

18. The illumination system of claim 17, further comprising a light diffusing element disposed on the prisms.

19. The illumination system of claim 16, further comprising a reflective polarizer disposed between the light refractive structure and the exit face, on the exit face.

20. The illumination system of claim 16, further comprising a second light refracting structure disposed in the aperture of the mirror.

* * * * *